UNITED STATES PATENT OFFICE.

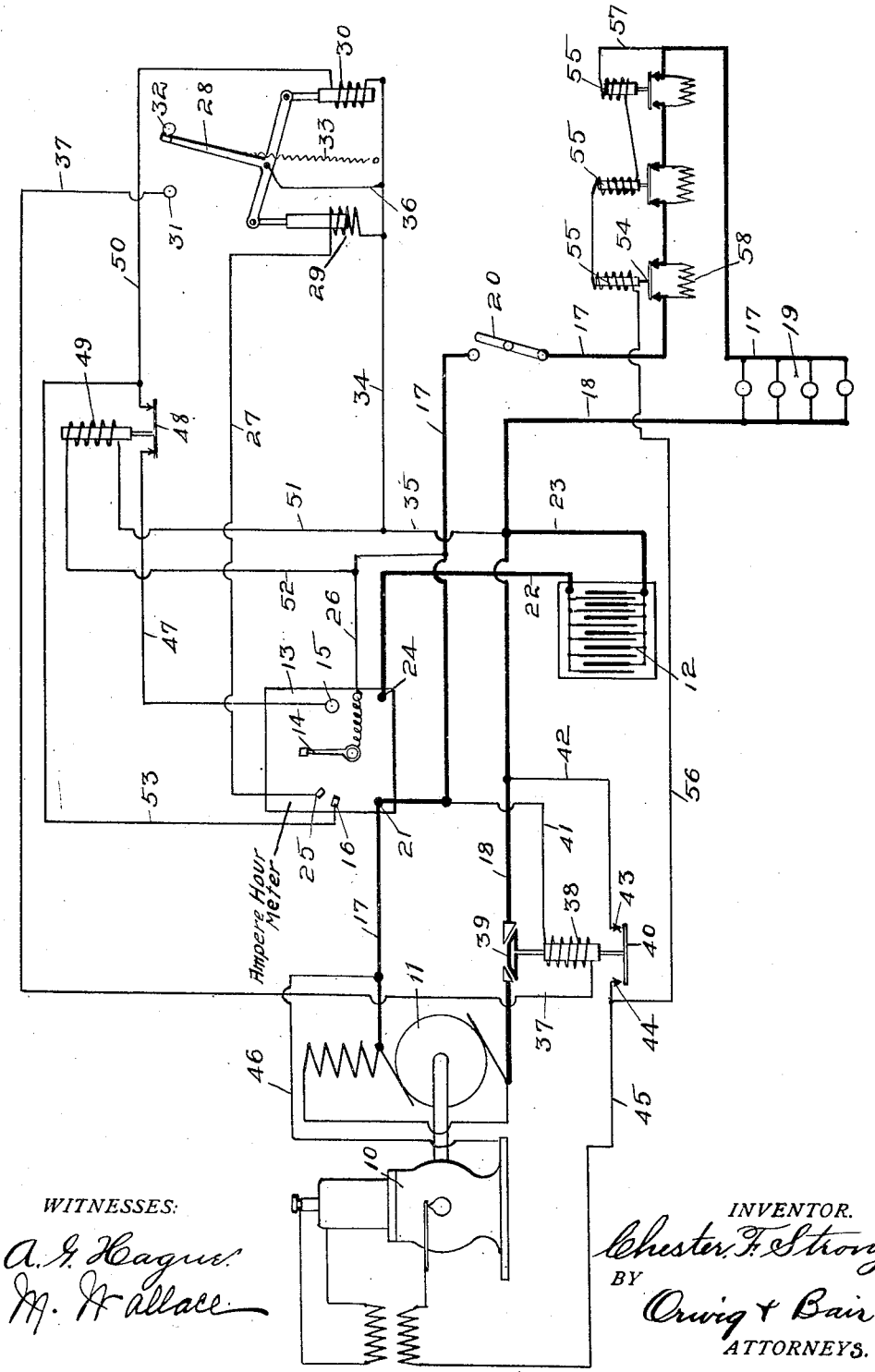

CHESTER F. STRONG, OF DES MOINES, IOWA.

AUTOMATIC ELECTRIC GENERATING APPARATUS.

1,225,283.            Specification of Letters Patent.        Patented May 8, 1917.

Application filed November 8, 1912. Serial No. 730,276.

*To all whom it may concern:*

Be it known that I, CHESTER F. STRONG, a citizen of the United States, residing at Des Moines, in the county of Polk and State of Iowa, have invented a certain new and useful Automatic Electric Generating Apparatus, of which the following is a specification.

My invention relates to that class of automatic electric generating apparatus in which are employed an internal combustion engine, a dynamo-electric machine adapted to operate either as a motor or a dynamo, and a storage battery together with automatically actuated elements that will start the engine when the storage battery has been sufficiently discharged and the engine, when started, will operate the dynamo-electric machine to recharge the storage battery, and when the storage battery is sufficiently recharged the operation of the engine will be discontinued.

My object is to provide an apparatus of this class of simple, durable and inexpensive construction and provided with automatically actuated elements so arranged as to automatically start the engine when a certain predetermined quantity of electrical current has been discharged from the storage battery, as distinguished from devices of this class in which the engine is started to operate upon the occurrence of certain conditions within the storage battery itself as, for instance, the discharge of the storage battery to a point where the voltage falls below a certain predetermined point.

A further object is to provide an apparatus of this class in which the engine is automatically stopped when the dynamo has generated and delivered to the storage battery, first, a certain measured quantity of electricity, and second, upon a rise in the voltage of the storage battery such as is commonly incident to a slight overcharge.

A further object is to provide an apparatus of this class in which a current from the storage battery or from the dynamo may be continuously used in any amount up to the full capacity of the storage battery either during the time that the engine is idle or during the time that the engine is operating the dynamo without in any way affecting the discharge of the battery to the certain predetermined amount or a proper recharge of the storage battery.

A further object is to provide means whereby, in the event that the internal combustion engine should fail to properly operate, the current used for operating the motor for the purpose of starting the internal combustion engine will be permitted to flow and operate the motor for a certain predetermined period only and will then be automatically cut off to thereby save the storage battery from injury and to provide a sufficient reserve in the storage battery for again operating the motor to start the engine after the defect in the engine has been remedied.

My invention consists in the arrangement and combination of the various parts of the apparatus by which the objects contemplated are attained, as hereinafter more fully set forth, pointed out in my claims, and illustrated in the accompanying drawings, in which:

The complete apparatus embodying my invention is illustrated diagrammatically.

Referring to the accompanying drawings, I have employed the reference numeral 10 to indicate an internal combustion engine of any ordinary type preferably provided with an electrical ignition device. The numeral 11 indicates a dynamo-electric machine, for use with direct current and operatively connected with the engine shaft.

The numeral 12 indicates a storage battery.

The reference numeral 13 indicates an ampere hour meter of any ordinary construction provided with a movable indicator 14 and with two electrical contacts and stops 15 and 16 at the opposite ends of the path of movement of the indicator 14. There are two classes of ampere hour meters in general use: one type being known as the simple ampere hour meter and the other being known as the compound ampere meter, it being understood by those skilled in the art that a compound ampere meter is so arranged that the meter runs faster when the current is running through it in one direction than it does when the current is running through it in the opposite direction, whereas a simple ampere hour meter is so arranged that the meter runs at approximately the same speed when the current is flowing through it in either direction. In connection with my invention, either type of ampere hour meter may be employed. I prefer however the so-called simple ampere hour meter as being less complicated and expensive.

Electrically connected with the dynamo-electric machine are two conductors 17 and 18 which lead to the "load" indicated by the numeral 19 as being electric lamps, it being understood of course that the electric current generated by this device may be employed for any purpose and the electric lamps are diagrammatically illustrated as a "load." In the conductor 17 is a hand operated switch 20 and in the conductor 18 is an automatic switch which will be hereinafter more fully described. The conductor 17 is also electrically connected with one of the binding posts of the ampere hour meter at 21.

The storage battery has two conductors 22 and 23 connected with it, the conductor 22 being also connected to the other binding post of the ampere hour meter at 24, and the conductor 23 is electrically connected with the conductor 18.

When the storage battery is being employed to carry the "load" the current thus generated may flow through the conductor 22 through the ampere hour meter, through the conductor 17 to the "load" and return through the conductor 18 to the conductor 23 and back to the storage battery. When an electric current is being generated by the dynamo-electric machine the current may flow from the generator through the conductor 17 to the ampere hour meter, through the ampere hour meter to the conductor 22 and from thence to the storage battery, and from the storage battery through the conductor 23 to the conductor 18, and back to the dynamo-electric machine. At the same time a current may also flow through the conductor 17 of the "load" and back through the conductor 18 to the dynamo. Hence if the dynamo-electric machine is running during the time that a "load" is being carried by the current only so much of the current thus generated will flow through the ampere hour meter as is ultimately utilized in recharging the storage battery, and that portion of the current thus generated by the dynamo-electric machine that goes to maintain the "load" will not affect the operation of the ampere hour meter. By the term "load" as here used, I mean that the current is being utilized in the service wires for the purpose of burning electric lamps or the like.

Assuming that the storage battery is wholly or partly charged and that a "load" is being carried then the current from the storage battery will flow through the ampere hour meter and this current will cause the indicator 14 to move toward the left. When the certain predetermined quantity of current has been discharged from the storage battery, the indicator arm 14 of the ampere hour meter will stand at about the position where it will be in contact with the contact point 25 on the ampere hour meter. The said indicator arm 14 is electrically connected by means of the conductor 26 with the conductor 17 and the contact point 25 is connected with a conductor 27.

I have provided means whereby when a circuit is thus established by reason of the contact of the indicator arm 14 with the contact point 25, the dynamo-electric machine will be operated as a motor to start the internal combustion engine and also to provide electric current for engine ignition. This mechanism is as follows: The reference numeral 28 indicates a T-shaped pivotally supported switch member having the solenoids 29 and 30 on two of its extremities. The other extremity is interposed between a contact stop 31 and a stop 32. A spring 33 is provided for yieldingly holding the switch against either one of the stops 31 or 32. The conductor 27 leads to the solenoid 29 and is electrically connected with a conductor 34 which in turn is electrically connected to a conductor 35 which in turn is electrically connected to the conductor 23. Hence, when the contact is made between the indicator arm 14 and the contact point 25, a circuit is established from the storage battery through the conductor 27 to the ampere hour meter through the conductor 17 to the conductor 26, through the arm 14 to the contact point 25, from the contact point 25, through the conductor 27 to the solenoid 29, and from the solenoid 29 through the conductors 34, 35 and 23 to the battery. The excitation of the solenoid 29 moves the switch 28 so that it contacts with the contact stop 31. A conductor 36 is connected to the conductor 34 and to the switch 28 and a conductor 37 is connected to the contact stop 31 and leads to a solenoid 38. The core of this solenoid 38 carries a switch 39 at one end for establishing or breaking a circuit through the conductor 18 and at its other end carries a double switch 40 for establishing or breaking the ignition circuit of the internal combustion engine hereinafter described. From the solenoid 38 a conductor 41 leads to the conductor 17.

From the foregoing description, it is obvious that when the indicator arm 14 reaches the contact 25 a circuit will be established from the battery that will energize the solenoid 29 and close a circuit from the battery which will have the effect of energizing the solenoid 38 which, when elevated, will close a circuit from the battery through the dynamo-electric machine, whereby the latter is operated.

The means for establishing a circuit through the ignition system of the internal combustion engine simultaneously with the establishment of a circuit through the dynamo-electric machine comprises a conductor 42 electrically connected with the conductor 18 and having two contact points 43 and 44 arranged to be engaged by the switch 40. A conductor 45 is connected to the contact point 44 and leads to the ignition system of the internal combustion engine, and a conductor 46 leads from the engine frame to the conductor 17 to complete the circuit.

Assuming that the engine has been started by the dynamo-electric machine in the manner just described, then the dynamo-electric machine will act as a dynamo and cause a current to flow through the conductor 17, through the ampere hour meter to the storage battery, and from the storage battery back through the conductors 23 and 18 to the dynamo-electric machine. This will have the effect of causing the indicator arm 14 of the ampere hour meter to move toward the right and after the proper predetermined quantity of electric current has flowed through the ampere hour meter for the purpose of recharging the battery, the indicator arm 14 will contact with and be stopped by the contact stop 15. When this occurs it is ordinarily desirable to stop the engine but under certain conditions it might be desirable to permit the engine to continue its operation until the battery is further recharged.

For the purpose of providing means for stopping the engine only after a certain predetermined quantity of electricity has flowed into the storage battery and the voltage of the storage battery has been raised to the point that indicates a full charge or a slight overcharge, I provide the following mechanism: Electrically connected with the contact stop 15 is a conductor 47 leading to a two-point switch 48, said switch being connected to the core of a solenoid 49. Leading from the two-point switch 48 is a conductor 50 connected to the solenoid 30. The said solenoid 49 is connected by the conductors 51 and 52 with the conductors 22 and 23 of the storage battery. This solenoid 49 is so constructed that it will only be sufficiently energized to raise the switch 48 when the storage battery is being fully charged or slightly overcharged, and hence has a voltage in excess of the normal maximum voltage it would have under normal discharge. This condition of a storage battery, wherein, when the battery has been fully charged in a normal manner, the voltage will rise above the normal discharging voltage as soon as a full charge or a slight overcharge occurs, is well known to those skilled in the art, and I take advantage of this well known condition by so arranging the solenoid 49 that when this rise in voltage occurs, the solenoid will be energized sufficiently to close the switch 48, and when this switch is closed the solenoid 30 will be energized to move the switch 28 to thereby break the circuit from the conductor 36 to the conductor 37. When this circuit is broken the solenoid 38 will become deënergized and the switches 39 and 40 will both be moved to open the circuits in which they operate; hence the dynamo-electric machine will be stopped.

In some instances it is possible that, due to some defect in the condition of the internal combustion engine, the engine will not operate when rotated by the dynamo-electric machine. When this condition occurs it is of course necessary that an operator should remedy the defect, and it is highly desirable under such conditions that the current from the storage battery be quickly cut off so that a complete discharge of the storage battery may be avoided.

For this purpose, I have provided the following device: On the ampere hour meter, slightly spaced apart to the left of the contact 25, is the contact stop 16 to coact with the indicator arm 14. This contact stop 16 is electrically connected by the conductor 53 with the conductor 50, and when the arm 14 is in engagement with the contact stop 16, the solenoid 30 will be energized and the circuit through the conductor 37 will be broken, thus preventing the loss of current from the storage battery through the dynamo-electric machine. This contact stop 16 is arranged relatively close to the contact 25 and when the indicator arm 14 reaches the contact 25 the dynamo-electric machine will be started, as before described. If, at the expiration of a period say, for instance, two minutes after the dynamo-electric machine has been operated from the storage battery, the engine should fail to start, then on account of the relatively large amount of current from the battery being thus employed to operate the dynamo-electric machine, the indicator arm 14 will come in contact with the contact stop 16, whereupon the current running from the battery to the dynamo-electric machine will be cut off and further waste of current in uselessly running the dynamo-electric machine will be avoided, and a part of the charge will be left remaining in the storage battery so that an operator may, after correcting the defect in the internal combustion engine, again employ the storage battery to operate the dynamo-electric machine to start the engine by simply manually holding the solenoid 38 in its closed position until the dynamo-electric machine starts the engine after which the solenoid 38 may be released and the operation of the device continued as before.

In connection with the use of my device and assuming that a comparatively heavy

"load" is being carried during the time that the storage battery is being recharged, and the dynamo-electric machine, is operating as a dynamo to produce current, it is desirable that the current thus produced by the dynamo-electric machine and delivered direct to the "load" be prevented from attaining a voltage higher than is desirable for the purposes of the "load." In order to meet this requirement, I have provided means for automatically preventing an excessive voltage in the current thus produced being delivered to the "load" as follows: In the conductor 17, I provide a number of switches 54, in the present instance three are illustrated. Each of these switches is provided with a solenoid 55. These solenoids are included in a circuit with the conductor 56 which in turn is electrically connected with the conductor 45 that leads to the engine ignition system. A conductor 57 leads from the last solenoid 55 to the conductor 17. At each of the switches 54 is a resistance 58 connecting the adjacent end of the conductor 17.

Assuming that there is a rise in voltage in the current being generated by the dynamo-electric machine for the "load" then the first solenoid 55 to the left will be energized by the current and the switch 54 elevated, thus causing the current to flow through the resistance 58 which slightly reduces the voltage. If the rise in the voltage still continues then the central solenoid 55 will be energized and further resistance thrown in, and so on. In this connection it is to be understood that the winding for the solenoid 55 is such that it will be energized to elevate the switch with a current of slightly less voltage than is necessary to energize the next solenoid to the right, and so on, and the parts are so arranged that when the resistance connected with the last solenoid 55 to the right is thrown in, it will be impossible for the current generated by the dynamo to have a voltage in excess of the normal maximum required for the "load."

One of the desirable features in connection with an apparatus of this kind is that it may operate automatically and without attention by an operator. In this connection it is well known to those skilled in the art that a storage battery is a delicate and sensitive device and that to operate efficiently, it should be charged slowly and when fully charged it should occasionally receive a slight overcharge, and also that it should be discharged almost completely before being recharged. Furthermore, the efficiency of the storage battery is fluctuating and under certain conditions the battery is capable of receiving and discharging a considerably greater amount of electricity than at other times, and under other conditions. It must also be taken into consideration that when a storage battery is nearly discharged, and a heavy "load" is thrown upon it, the voltage falls rapidly, even though the battery has not been sufficiently discharged to place it in condition for recharging. Therefore the voltage of a storage battery is not a proper test under all conditions for governing the time when the battery is in proper condition for recharging.

I obviate these difficulties and take advantage of the above named characteristics of the storage battery in my improved apparatus by providing a means for determining when the storage battery shall be recharged, which means is controlled solely by the amount of current measured by ampere hours that has been discharged from the battery, and I have arranged my improved apparatus so that the engine is stopped only after the occurrence of two essentials, to wit: the flow of a certain predetermined amount of electric current into the storage battery measured by ampere hours and also the rise in voltage of the battery occasioned by a full charge or a slight overcharge. Hence, regardless of the various conditions of a storage battery, I obtain a proper discharge of the battery before recharging commences and I also obtain a substantially complete recharge of the battery measured by ampere hours and a test of the condition of the recharged battery measured by the rise in voltage.

Another advantageous feature of my invention is that when the dynamo-electric machine is operated by the battery to start the engine, it will run only for a time sufficient, under ordinary circumstances, to start the engine, then if the engine does not start the current will be cut off and loss of current from the battery and consequent injury to the battery will be prevented.

A further advantageous feature of my invention is that current may be provided direct from the dynamo-electric machine to the "load" and the voltage of the current thus directly provided will be automatically prevented from rising above the normal maximum for the "load."

I claim as my invention:

1. In an automatic electric generating apparatus, the combination of an engine, a dynamo electric machine, a storage battery, service wires, an ampere hour meter, means for electrically connecting the storage battery, the dynamo electric machine, the service wires and the ampere hour meter, whereby all of the current flowing from the dynamo electric machine to the storage battery will flow through the ampere hour meter, and all of the current flowing from the storage battery will also flow through the ampere hour meter, and current flowing from the dynamo electric machine to the service wires will pass directly to the service wires and will not pass through the ampere hour meter, said ampere hour meter being capable of being operated in one direction by the current flowing from the dynamo electric machine to the storage battery, and of being operated in the opposite direction by the current flowing from the storage battery either to the dynamo electric machine or the service wires, and means actuated by said ampere hour meter when in one position of its movement for operating the dynamo electric machine from the storage battery to start the engine.

2. In an automatic electric generating apparatus, the combination of an engine having an electric ignition circuit, a dynamo electric machine, a storage battery, service wires, an ampere hour meter, means for electrically connecting the storage battery, the dynamo electric machine, the service wires and the ampere hour meter, whereby all of the current flowing from the dynamo electric machine to the storage battery will flow through the ampere hour meter, and all of the current flowing from the storage battery will also flow through the ampere hour meter, and current flowing from the dynamo electric machine to the service wires will pass directly to the service wires and will not pass through the ampere hour meter, said ampere hour meter being capable of being operated in one direction by the current flowing from the dynamo electric machine to the storage battery, and of being operated in the opposite direction by the current flowing from the storage battery either to the dynamo electric machine or the service wires, and means actuated by said ampere hour meter when in one position of its movement for interrupting the current flow between the dynamo-electric machine and the storage battery and in the ignition circuit of the engine to stop the dynamo-electric machine and engine.

3. In an automatic electric generating apparatus, the combination of an engine having an electric ignition circuit, a dynamo electric machine, a storage battery, service wires, an ampere hour meter, means for electrically connecting the storage battery, the dynamo electric machine, the service wires and the ampere hour meter, whereby all of the current flowing from the dynamo electric machine to the storage battery will flow through the ampere hour meter, and all of the current flowing from the storage battery will also flow through the ampere hour meter, and current flowing from the dynamo electric machine to the service wires will pass directly to the service wires and will not pass through the ampere hour meter, said ampere hour meter being capable of being operated in one direction by the current flowing from the dynamo electric machine to the storage battery, and of being operated in the opposite direction by the current flowing from the storage battery either to the dynamo electric machine or the service wires, and means actuated by said ampere hour meter when in one position of its movement for operating the dynamo electric machine from the storage battery to start the engine, and for supplying current to the engine for ignition purposes.

4. In an automatic electric generating apparatus, the combination of an engine having an electric ignition circuit, a dynamo electric machine, a storage battery, service wires, an ampere hour meter, means for electrically connecting the storage battery, the dynamo electric machine, the service wires and the ampere hour meter, whereby all of the current flowing from the dynamo electric machine to the storage battery will flow through the ampere hour meter, and all of the current flowing from the storage battery will also flow through the ampere hour meter, and current flowing from the dynamo electric machine to the service wires will pass directly to the service wires and will not pass through the ampere hour meter, said ampere hour meter being capable of being operated in one direction by the current flowing from the dynamo electric machine to the storage battery, and of being operated in the opposite direction by the current flowing from the storage battery either to the dynamo electric machine or the service wires, and means actuated by said ampere hour meter when in one position of its movement for operating the dynamo electric machine from the storage battery to start the engine, and when in another position of its movement for interrupting the current flow between the dynamo electric machine to stop the dynamo electric machine and battery and in the ignition circuit and engine.

5. In an automatic electric generating apparatus, the combination of an engine, a dynamo-electric machine operatively connected therewith, a storage battery electrically connected with the dynamo-electric machine, a current measuring device arranged in the circuit between the dynamo-electric machine and the storage battery, an electric ignition device for the engine, and two coacting means for breaking the circuit of the electric ignition device, one of said means being controlled by the current measuring device and the other by a rise in the battery voltage, said coacting means being so arranged that both must be actuated before the ignition circuit is broken.

6. In an automatic electric generating apparatus, the combination of an engine, a dynamo-electric machine operatively connected therewith, a storage battery electrically connected with the dynamo-electric machine, a current measuring device arranged in the circuit between the dynamo-electric machine and the storage battery, an electric ignition device for the engine, an independent electric circuit designed to be closed by the current measuring device, means automatically actuated by the closing of said independent circuit for breaking the circuit through the engine ignition device, and a switch in said independent circuit normally open and automatically closed by a rise in voltage of the storage battery.

7. In an automatic electric generating apparatus, the combination of an internal combustion engine having an electric ignition device, a dynamo-electric machine operatively connected therewith, a storage battery electrically connected with the dynamo-electric machine, an ampere hour meter included in the circuit between the dynamo-electric machine and the battery, and having a movable indicator arm and also having a contact device for the movable indicator arm, an independent circuit in which the movable indicator arm and the contact device are included, means automatically actuated upon the closing of this independent circuit for breaking the circuit through the engine ignition device, and a switch included in said independent circuit normally open and designed to be automatically closed upon a rise in voltage of the storage battery.

8. In an automatic electric generating apparatus, the combination of an internal combustion engine, a dynamo-electric machine operatively connected therewith, a storage battery electrically connected with the dynamo-electric machine, an ampere hour meter included in the circuit between the dynamo-electric machine and the battery, and means controlled by the ampere hour meter, after a certain predetermined amount of electricity has passed from the dynamo-electric machine to the storage battery, for stopping the operation of the engine, said latter means also including a switch device operated by a rise in voltage in the storage battery, and said parts being so arranged that the latter means must be operated before the engine will stop.

9. In an automatic electric generating apparatus, the combination of an internal combustion engine, a dynamo electric machine operatively connected therewith, a storage battery electrically connected with the dynamo-electric machine, an ampere hour meter included in the circuit between the dynamo-electric machine and the battery, means controlled by the ampere hour meter, after a certain predetermined amount of electricity has passed from the dynamo electric machine to the storage battery, for cutting off the current required for the operation of the engine, said latter means also including a switch device operated by a rise in voltage in the storage battery, and said parts being so arranged that the latter means must be operated before the engine will stop, the said means for stopping the engine comprising an electric ignition device, and a switch device for jointly closing the circuit through the electric ignition and the circuit between the dynamo electric machine and battery at the same time.

CHESTER F. STRONG.

Witnesses:
M. WALLACE,
A. G. HAGUE.

Copies of this patent may be obtained for five cents each, by addressing the "Commissioner of Patents, Washington, D. C."